Feb. 14, 1939.     G. W. HAURY     2,147,032
TOOL FOR WORKING TUBING
Filed Oct. 6, 1936
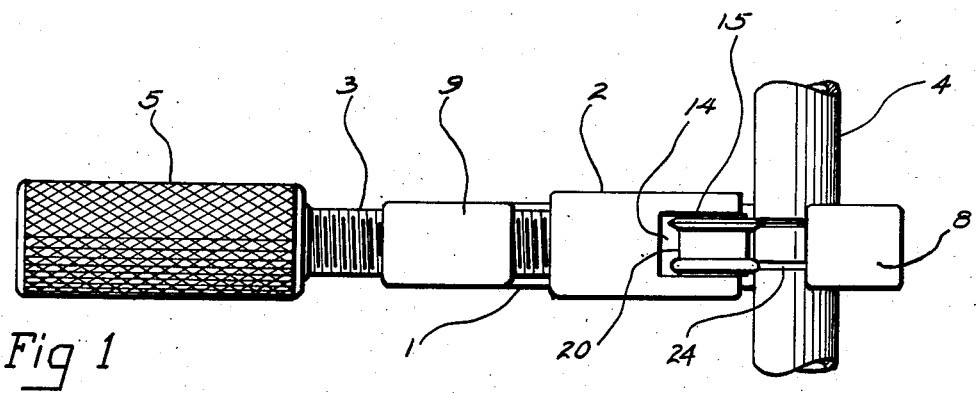
Fig 1
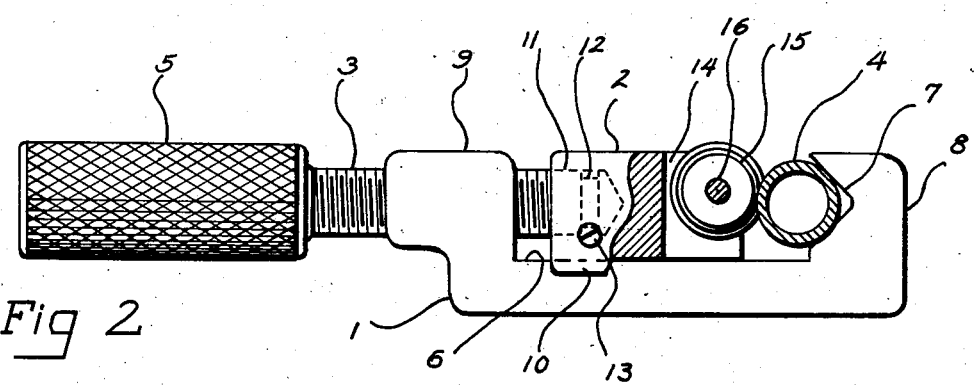
Fig 2
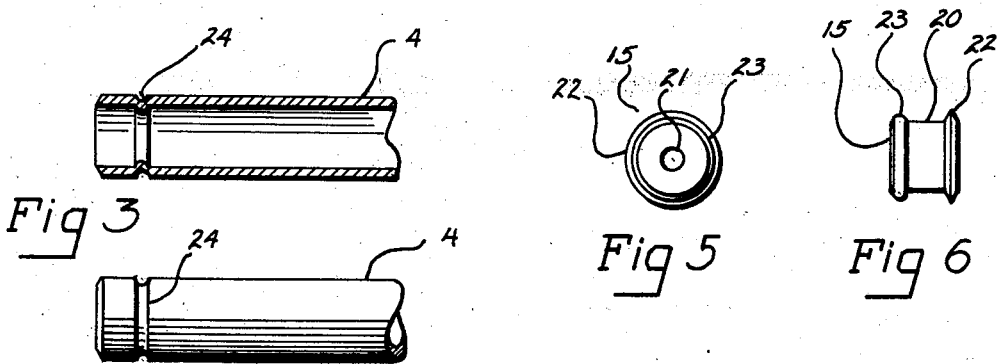
Fig 3
Fig 4
Fig 5
Fig 6
George W Haury
INVENTOR.
BY
ATTORNEYS.

Patented Feb. 14, 1939

2,147,032

UNITED STATES PATENT OFFICE 2,147,032

TOOL FOR WORKING TUBING

George W. Haury, Chicago, Ill., assignor to The Imperial Brass Manufacturing Company, Chicago, Ill.

Application October 6, 1936, Serial No. 104,255

1 Claim. (Cl. 81—1)

My invention relates to tools and particularly to tools for working on copper, brass and aluminum tubing.

The object of my invention is the provision of a new and improved tool which will simultaneously cut and groove tubing.

Another object is to provide a new and improved tool which will groove tubing at a predetermined distance from the end.

Still another object is to provide a new and improved tool for working tubing which will form a groove of a predetermined depth in the tubing.

A further object is to provide a new and improved tool for working tubing which will simultaneously cut and groove tubing, the groove being formed at a predetermined distance from the end and of a limited depth.

Further objects and advantages of my invention will become apparent as the description proceeds, taken in connection with the accompanying drawing which forms a part of this specification.

Fig. 1 is a top view of my tool.

Fig. 2 is a side view.

Fig. 3 shows a section and Fig. 4 a side view of a tube after working.

Fig. 5 and Fig. 6 show views of the disc.

While I have shown in the drawing and shall herein describe in detail the preferred embodiment of my invention, it is to be understood that I do not thereby intend to limit the invention to the specific form disclosed, but aim to cover all the modifications and alternative constructions falling within the spirit and scope of the appended claim.

A body 1 is shown having mounted thereon a carriage 2 driven by a screw 3. A tube 4 is the subject of the work and a handle 5 is used for turning the screw to drive the carriage to and away from the work.

The body is constructed with an open central portion 6 at one end of which is a V shaped recess 7 in the projection 8 for holding the tube. At the opposite end another projection 9 is screw threaded to accommodate the screw 3.

There is a sliding contact between the carriage 2 and the body, the carriage being equipped with a depending shoulder 10 on each side to guide it laterally along the portion 6 of the body and maintain it in perfect cutting alignment during operation. At the left the carriage has a hole 11 to accommodate the screw 3 which is constructed with an annular recess 12 near the end. A pin 13 fits into the recess and secures the screw swivelly to the carriage.

At the right the carriage has a U shaped slot 14 for mounting the cutting disc 15 secured within the slot by means of a pin 16. The construction of the disc determines the effectiveness of the tool. A cylindrical body 20 of the disc is pierced by a hole 21 through which the screw 16 is inserted. On one side of the body is an annular cutting edge 22 which projects beyond the circumference of the cylinder, whose purpose it is to cut the tubing and to guide the action of the disc. Spaced from the cutting edge is a more rounded annular grooving edge 23 also projecting from the cylindrical surface. The projection of the circumference of the grooving edge from the surface of the cylindrical body 20 determines the maximum depth of the groove.

It will be noted that the center of the cutting disc is positioned slightly nearer the lateral opening of the open central portion 6 than is the center of a tube inserted in the V shaped recess. Consequently, when the disc is in contact with the tube there is less space between it and the outside of projection 8 than the inside, so that if by chance the tube should shift in the tool it would slip inward and the tool would not drop from a worker's hand.

When it is desired to groove the end of a tube the tube is placed in the tool as shown in Figs. 1 and 2. The carriage is screwed in so that the cutting edge 22 begins to cut into the tube and the tool then rotated around the tube, the carriage being screwed in continually deeper. After the cutting edge 22 has taken a grip and before the tube has been entirely cut through the rounded grooving edge 23 begins to contact and to steadily impress a groove 24 around the tube, similar to the groove illustrated in Figs. 3 and 4. The cutting edge while performing the cutting operation thus serves simultaneously as a guide for the grooving operation.

In addition the cylindrical body 20 eventually comes into contact with the tube as the rounded edge sinks deeper to form the groove and prevents the groove being made any deeper than the distance the grooving edge is set above the surface of the cylinder. This limiting of the depth of the groove is important to preventing weakening of the tube should excessive grooving be permitted. Before the body 20 of the disc comes into contact with the tube the edge 22 has cut its way through the wall and the operation is complete as soon as the groove is finished.

Having thus described my invention what I aim and seek to secure by Letters Patent is:—

A tool for working copper tubing comprising a body having means for holding the tubing, a carriage mounted on the body, means for translating the carriage along the body to and away from the holding means, a single working element mounted on the carriage comprising a single sharp cutting edge projecting beyond the surface of the element at one side thereof, a rounded grooving edge projecting beyond the surface of the element a distance less than the projection of the cutting edge and spaced laterally from said cutting edge, said element being operable from one side only of the tool to perform a grooving operation on the tubing simultaneously with a cutting operation carried out on said same side only of the tool so that both operations are performed jointly by movement of the carriage into cutting position.

GEORGE W. HAURY.